United States Patent
Sako et al.

(10) Patent No.: US 8,125,868 B2
(45) Date of Patent: *Feb. 28, 2012

(54) OPTICAL DISC, OPTICAL DISC RECORDING APPARATUS AND METHOD, OPTICAL DISC REPRODUCING METHOD

(75) Inventors: Yoichiro Sako, Tokyo (JP); Takashi Kihara, Chiba (JP); Tomihiro Nakagawa, Kanagawa (JP); Tatsuya Inokuchi, Tokyo (JP)

(73) Assignee: Sony Corporation (JP)

( * ) Notice: Subject to any disclaimer, the term of this patent is extended or adjusted under 35 U.S.C. 154(b) by 659 days.

This patent is subject to a terminal disclaimer.

(21) Appl. No.: 11/043,635

(22) Filed: Jan. 26, 2005

(65) Prior Publication Data

US 2005/0128905 A1 Jun. 16, 2005

Related U.S. Application Data

(62) Division of application No. 10/203,530, filed as application No. PCT/JP01/10909 on Dec. 12, 2001, now Pat. No. 6,852,383.

(30) Foreign Application Priority Data

Dec. 19, 2000 (JP) ............................... P2000-386053
Jun. 29, 2001 (JP) ............................... P2001-200012

(51) Int. Cl.
*G11B 11/00* (2006.01)
*G11B 7/24* (2006.01)

(52) U.S. Cl. .................................. 369/53.21; 369/275.3

(58) Field of Classification Search .................. None
See application file for complete search history.

(56) References Cited

U.S. PATENT DOCUMENTS

| 5,218,599 A | 6/1993 | Tsuyoshi et al. |
| 5,243,589 A | 9/1993 | Stuke et al. |
| 5,400,319 A * | 3/1995 | Fite et al. .................. 369/275.5 |
| 5,541,904 A * | 7/1996 | Fite et al. .................. 369/53.21 |
| 5,715,232 A | 2/1998 | Chikazawa et al. |
| 5,809,007 A | 9/1998 | Takemura et al. |
| 5,822,287 A | 10/1998 | Kubota et al. |
| 6,052,465 A | 4/2000 | Gotoh et al. |
| 6,215,759 B1 | 4/2001 | Tanoue et al. |
| 6,310,854 B1 | 10/2001 | Sato et al. |
| 6,335,912 B1 * | 1/2002 | Kobayashi et al. .......... 369/59.1 |
| 6,665,240 B1 * | 12/2003 | Kobayashi et al. ........ 369/47.15 |
| 6,765,852 B1 * | 7/2004 | Van Den Enden et al. 369/53.21 |
| 6,852,383 B2 * | 2/2005 | Sako et al. ................... 428/64.1 |
| 2001/0013023 A1 * | 8/2001 | Oshima et al. .................. 705/57 |
| 2002/0191499 A1 * | 12/2002 | Ando et al. ............... 369/30.03 |
| 2003/0012099 A1 | 1/2003 | Sako et al. |
| 2004/0027980 A1 | 2/2004 | Sako et al. |

FOREIGN PATENT DOCUMENTS

EP 0759611 2/1997

(Continued)

*Primary Examiner* — Christopher R Lamb
(74) *Attorney, Agent, or Firm* — Lerner, David, Littenberg, Krumholz & Mentlik, LLP

(57) ABSTRACT

The present invention provides an optical disc recording method of irradiating an optical beam to an optical disc including a basal plate made of synthetic resin which has a concavo-convex pattern formed in advance on one surface thereof, and a reflective coat made of metal which is formed over the concavo-convex pattern on the basal plate, to physically change the concavo-convex pattern so as to record identification data.

6 Claims, 10 Drawing Sheets

FOREIGN PATENT DOCUMENTS

| | | |
|---|---|---|
| JP | 62-150564 A | 7/1987 |
| JP | 02-056750 A | 2/1990 |
| JP | 5-210874 A | 8/1993 |
| JP | 08-096362 A | 4/1996 |
| JP | 08-129828 A | 5/1996 |
| JP | 09-054987 A | 2/1997 |
| JP | 10-134415 A | 5/1998 |
| JP | 10134415 | 5/1998 |
| JP | 10-233019 A | 9/1998 |
| JP | 2000-040403 A | 2/2000 |
| JP | 2000113452 A * | 4/2000 |
| JP | 2000-222782 A | 8/2000 |
| WO | WO-96/10250 A1 | 4/1996 |
| WO | 96/16401 A1 | 5/1996 |
| WO | WO-00/49609 A2 | 8/2000 |

\* cited by examiner

|  | data bits | channel bits |  | data bits | channel bits |
|---|---|---|---|---|---|
| 0 | 00000000 | 01001000100000 | 64 | 01000000 | 01001000100100 |
| 1 | 00000001 | 10000100000000 | 65 | 01000001 | 10000100100100 |
| 2 | 00000010 | 10010000100000 | 66 | 01000010 | 10010000100100 |
| 3 | 00000011 | 10001000100000 | 67 | 01000011 | 10001000100100 |
| 4 | 00000100 | 01000100000000 | 68 | 01000100 | 01000100100100 |
| 5 | 00000101 | 00000100010000 | 69 | 01000101 | 00000000100100 |
| 6 | 00000110 | 00010000100000 | 70 | 01000110 | 00010000100100 |
| 7 | 00000111 | 00100100000000 | . | . | . |
| 8 | 00001000 | 01001001000000 | . | . | . |
| 9 | 00001001 | 10000001000000 | . | . | . |
| . | . | . | 86 | 01010110 | 00010010000100 |
| . | . | . | 87 | 01010111 | 00100010000100 |
| . | . | . | 88 | 01011000 | 01001000000100 |
| 21 | 00010101 | 00000010000000 | 89 | 01011001 | 10000000000100 |
| 22 | 00010110 | 00010010000000 | 90 | 01011010 | 10010000000100 |
| 23 | 00010111 | 00100010000000 | 91 | 01011011 | 10001000000100 |
| 24 | 00011000 | 01001000010000 | 92 | 01011100 | 01000000000100 |
| •25 | 00011001 | 10000000010000 | 93 | 01011101 | 00001000000100 |
| 26 | 00011010 | 10010000010000 | 94 | 01011110 | 00010000000100 |
| 27 | 00011011 | 10001000010000 | 95 | 01011111 | 00100000000100 |
| 28 | 00011100 | 01000000010000 | 96 | 01100000 | 01001000100010 |
| 29 | 00011101 | 00001000010000 | 97 | 01100001 | 10000100100010 |
| 30 | 00011110 | 00010000010000 | 98 | 01100010 | 10010000100010 |
| 31 | 00011111 | 00100000010000 | 99 | 01100011 | 10001000100010 |
| 32 | 00100000 | 00000000100000 | 100 | 01100100 | 01000100100010 |
| 33 | 00100001 | 10000100001000 | . | . | . |
| 34 | 00100010 | 00001000100000 | . | . | . |
| 35 | 00100011 | 00100100100000 | . | . | . |
| . | . | . | 116 | 01110100 | 01000010000010 |
| . | . | . | 117 | 01110101 | 00000010000010 |
| . | . | . | 118 | 01110110 | 00010010000010 |
| 55 | 00110111 | 00100010001000 | 119 | 01110111 | 00100010000010 |
| 56 | 00111000 | 01001000001000 | 120 | 01111000 | 01001000000010 |
| 57 | 00111001 | 10000000001000 | 121 | 01111001 | 00001001001000 |
| 58 | 00111010 | 10010000001000 | 122 | 01111010 | 10010000000010 |
| 59 | 00111011 | 10001000001000 | 123 | 01111011 | 10001000000010 |
| 60 | 00111100 | 01000000001000 | 124 | 01111100 | 01000000000010 |
| 61 | 00111101 | 00001000001000 | 125 | 01111101 | 00001000000010 |
| 62 | 00111110 | 00010000001000 | 126 | 01111110 | 00010000000010 |
| 63 | 00111111 | 00100000001000 | 127 | 01111111 | 00100000000010 | d1 ----- d8
C1 ------------- C14

FIG.6

| | | | | | |
|---|---|---|---|---|---|
| 128 | 10000000 | 01001000100001 | 192 | 11000000 | 01000100100000 |
| 129 | 10000001 | 10000100100001 | 193 | 11000001 | 10000100010001 |
| 130 | 10000010 | 10010000100001 | 194 | 11000010 | 10010010010000 |
| 131 | 10000011 | 10001000100001 | 195 | 11000011 | 00001000100100 |
| 132 | 10000100 | 01000100100001 | 196 | 11000100 | 01000100010001 |
| 133 | 10000101 | 00000000110001 | 197 | 11000101 | 00000100010001 |
| 134 | 10000110 | 00010000100001 | 198 | 11000110 | 00010010010000 |
| 135 | 10000111 | 00100100100001 | 199 | 11000111 | 00100100010001 |
| 136 | 10001000 | 01001001000001 | 200 | 11001000 | 00001001000001 |
| 137 | 10001001 | 10000001000001 | | . | |
| 138 | 10001010 | 10010001000001 | | . | |
| 139 | 10001011 | 10001001000001 | 220 | 11011100 | 01000000010001 |
| | . | | 221 | 11011101 | 00001000010001 |
| | . | | 222 | 11011110 | 00010000010001 |
| 158 | 10011110 | 00010000000001 | 223 | 11011111 | 00100000010001 |
| 159 | 10011111 | 00100000000001 | 224 | 11100000 | 01000100000010 |
| 160 | 10100000 | 00001000100001 | 225 | 11100001 | 00000100000010 |
| 161 | 10100001 | 10000100001001 | 226 | 11100010 | 10000100010010 |
| 162 | 10100010 | 01000100010000 | 227 | 11100011 | 00100100000010 |
| 163 | 10100011 | 00000100100001 | 228 | 11100100 | 01000100010010 |
| 164 | 10100100 | 01000100001001 | 229 | 11100101 | 00000100010010 |
| 165 | 10100101 | 00000100001001 | 230 | 11100110 | 01000000100010 |
| 166 | 10100110 | 01000000100001 | 231 | 11100111 | 00100100010010 |
| 167 | 10100111 | 00100100001001 | 232 | 11101000 | 01001001001001 |
| 168 | 10101000 | 01001001001001 | 233 | 11101001 | 10000100000010 |
| 169 | 10101001 | 10000001001001 | 234 | 11101010 | 00001001001001 |
| 170 | 10101010 | 10010001001001 | | . | |
| | . | | | . | |
| | . | | 248 | 11111000 | 01001000010010 |
| 184 | 10111000 | 00100000001001 | 249 | 11111001 | 10000000010010 |
| 185 | 10111001 | 10000000001001 | 250 | 11111010 | 10010000010010 |
| 186 | 10111010 | 10010000001001 | 251 | 11111011 | 10001000010010 |
| 187 | 10111011 | 10001000001001 | 252 | 11111100 | 01000000010010 |
| 188 | 10111100 | 01000000001001 | 253 | 11111101 | 00001000010010 |
| 189 | 10111101 | 00001000001001 | 254 | 11111110 | 00010000010010 |
| 190 | 10111110 | 00010000001001 | 255 | 11111111 | 00100000010010 |
| 191 | 10111111 | 00100000001001 | | data bits | channel bits | d1 ----- d8

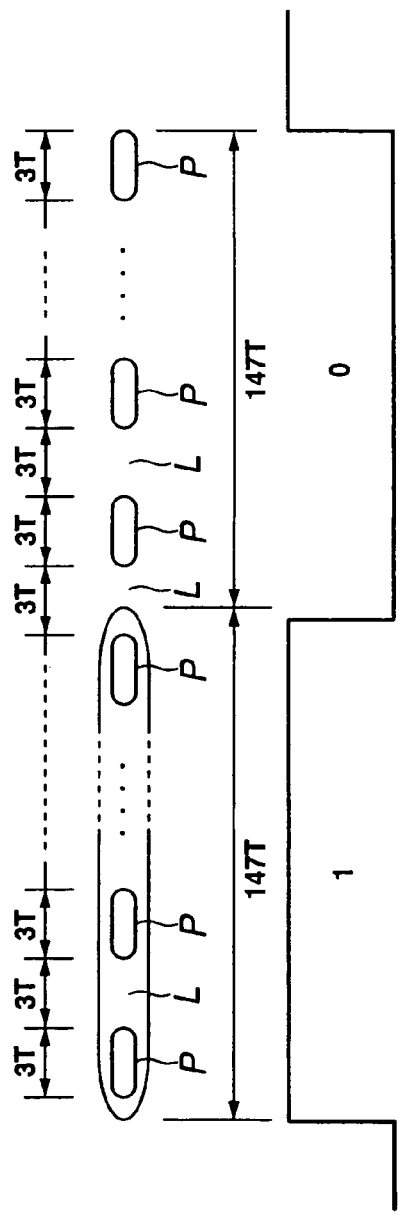
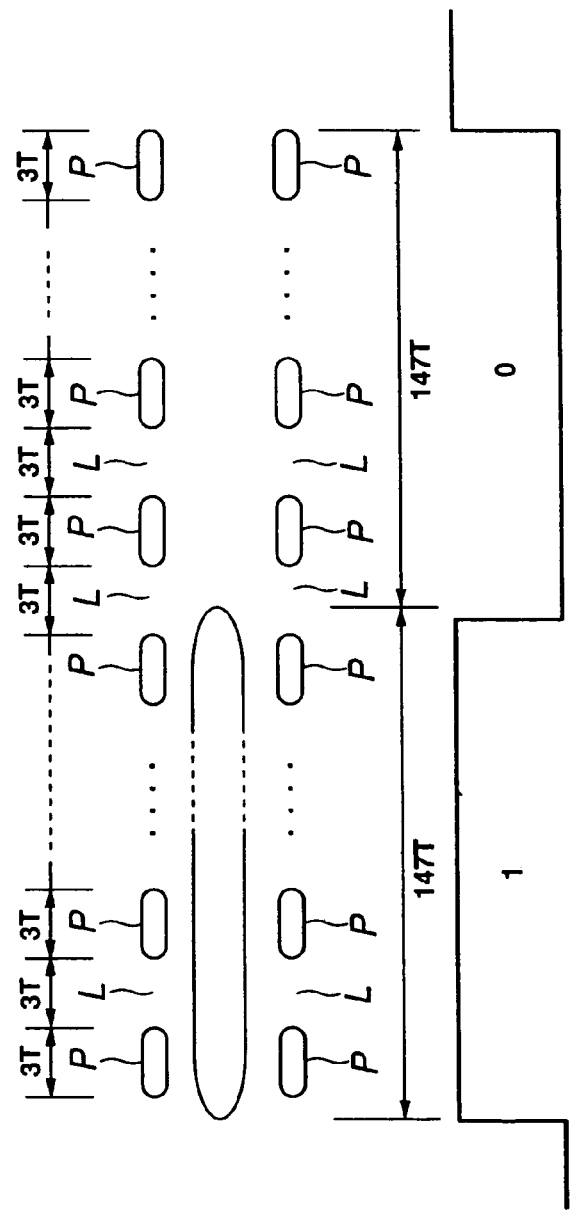
FIG.11A
FIG.11B

OPTICAL DISC, OPTICAL DISC RECORDING APPARATUS AND METHOD, OPTICAL DISC REPRODUCING METHOD

TECHNICAL FIELD

This invention relates to an optical disc which has recorded thereon first data such as music data, and second data such as identification data which is inherent in each optical disc and used to identify each optical disc, optical disc recording apparatus and method for recording information to the optical disc, and optical disc reproducing method for reproducing information recorded on the optical disc.

BACKGROUND ART

Conventionally, a compact disc (hereinafter referred to simply as a "CD") or a digital versatile disc (hereinafter referred to simply as a "DVD") is used as an optical disc, on which digital content of music data, picture data, video data having copyright is recorded, and from which such data can be reproduced using an optical playback means. An optical disc of this kind has digital content recorded thereon in a standardized recording format.

Optical discs are used as recording media, which can be mass-produced from a master disc and can be distributed widely for commercial purposes. Optical discs having the same digital content are basically of the same shape, and are housed in packages to be distributed, respectively. For the purpose of identifying so called "packaged media" each containing an independent optical disc to be distributed with common digital content, generally, a printed material having a serial number printed thereon is included in each package. In addition, a label having such serial number printed thereon is stuck to each package.

Even though each of these packaged media can identify its optical disc using a serial number attached thereto, it is impossible to identify each optical disc itself without its package. Furthermore, in the event that a label with a serial number is peeled off to be lost, or a printed material with a serial number is lost, an optical disc cannot correspond to its serial number on its label or printed material. Furthermore, in the event that an optical disc itself is transferred to anyone apart from its package, it also may become difficult to manage the optical disc using its serial number.

DISCLOSURE OF THE INVENTION

Accordingly, the present invention has an object to overcome the above-mentioned drawbacks of the prior art by providing an optical disc which has first data recorded to a first recording pattern of a first recording area and second data, different from the first data, recorded to a second recording pattern of a second recording area, which can be managed surely, optical disc recording apparatus and method for recording information to the optical disc, and optical disc reproducing method for reproducing information recorded on the optical disc.

The above object can be attained by providing an optical disc, including:

a basal plate made of synthetic resin which has a concavo-convex pattern formed in advance on one surface thereof based on data, and a reflective coat made of metal which is formed over the concavo-convex pattern on the basal plate, wherein identification data is recorded by irradiating an optical beam to the reflective coat to physically change the concavo-convex pattern.

The identification data is recorded on the concavo-convex pattern. And the concavo-convex pattern is composed of a plurality of pits and a plurality of lands.

The identification data is recorded by irradiating an optical beam to the reflective coat to, physically change the reflective coat and the basal plate such that physically changed portions of the reflective coat and the basal plate have the same optical characteristics as those of the pits.

The basal plate has another concavo-convex pattern formed in advance, and the identification data is recorded along the concavo-convex patterns.

The above object can be attained by providing an optical disc which has-at least one recording area in which a concavo-convex pattern is formed based on data including recording data, and identification data is recorded based on the concavo-convex pattern formed at a predetermined position in the recording area.

The above object can be attained by providing an optical disc recording method of irradiating an optical beam to an optical disc including a basal plate made of synthetic resin which has a concavo-convex pattern formed in advance on one surface thereof, and a reflective coat made of metal which is formed over the concavo-convex pattern on the basal plate, to physically change the concavo-convex pattern so as to record identification data.

The identification data is recorded by irradiating an optical beam to the reflective coat to physically change the reflective coat and the basal plate such that physically changed portions of the reflective coat and the basal plate have the same optical characteristics as those of the pits.

The above object can be attained by providing an optical disc reproducing method of detecting identification data from data read out from an optical disc which comprises a basal plate made of synthetic resin which has a concavo-convex pattern formed in advance on one surface thereof based on data, and a reflective coat made of metal which is formed over the concavo-convex pattern on the basal plate, and identification data is recorded by irradiating an optical beam to the reflective coat to physically change the concavo-convex pattern, wherein playback operation for the optical disc is suspended when the identification data cannot be detected.

The above object can be attained by providing an optical disc recording apparatus, including:

a light source;

a data generator for generating either of recording data, or data for recording identification data later;

a modulator for modulating a laser beam irradiated from the light source based on output data from the data generator; and an objective lens for condensing a laser beam modulated by the modulator to a photo-resist applied to a glass master disc.

The optical disc recording apparatus further includes an encoding unit for modulating the recording data and the data for recording identification data later, and supplying modulated output data to the data generator.

The following practical example will explain further the other purposes of the invention and the material benefits to be obtained from the invention.

BRIEF DESCRIPTION OF THE DRAWINGS

FIG. 6 shows the first half of an EFM conversion table.

FIG. 7 shows the latter half of the EFM conversion table shown in FIG. 6.

FIG. 11 shows a state in which identification data is recorded on the pit pattern shown in FIG. 9.

BEST MODE FOR CARRYING OUT THE INVENTION

Hereinafter, the optical disc, optical disc recording apparatus and method, and optical disc reproducing method according to the present invention will be described referring to accompanying drawings.

Figure 1:
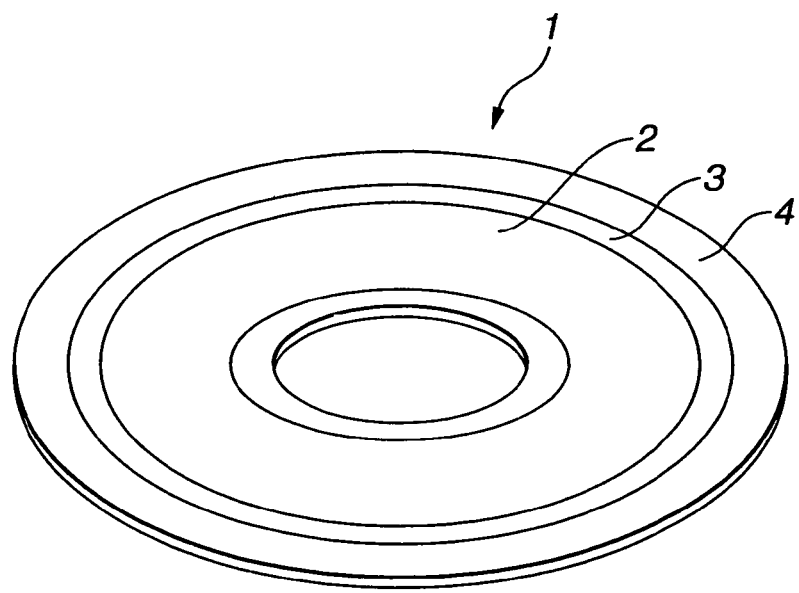
FIG. 1 shows a perspective view of the optical disc according to the present invention.

First of all, an optical disc 1 according to the present invention has a first recording area 2 located at its innermost area where first digital content is to be recorded as first data in the same recording format as that of a CD (Compact disc) in which music data is recorded, a second recording area 3 located at the outside or outer circumference of the first recording area 2 where identification data, which is inherent in each recording medium, is to be recorded as second data, and a third recording area 4 located at the outside of the second recording area 3 where second digital content, which relates to or is different from the first digital content recorded to the first recording area 2, is to be recorded as third data, as shown in the FIG. 1. In the third recording area 4, the second digital content is recorded in the same format as that recorded to the first recording area 2 in a doubled recording density, for example, of the first recording area 2.

The first digital content to be recorded to the first recording area 2 is data such as music data, picture data, video data, audio data, which configures the main content data to be recorded to the optical disc 1.

The second digital content to be recorded to the third recording area 4, for example, includes a part of the first digital content to be recorded to the first recording area 2, and if the first digital content to be recorded to the first recording area 2 is audio data, the second digital content to be recorded to the third recording area 4 is audio data of higher quality than that of the audio data to be recorded to the first recording area 2. The second digital content to be recorded to the third recording area 4 is signal-compressed picture data and text data, as data relating to the first digital content. Specifically, the second digital content includes data of posters, song lyrics, interview articles, information on a newly released music and so on, which all belong to the first digital content to be recorded to the first recording area 2.

The identification data to be recorded to the second recording area 3 is. individual ID data being inherent in each recording medium for identifying optical discs one by one. Specifically, the individual ID data is, for example, data of a recording medium number used to perform register for distributing the optical disc 1, a manufacturing apparatus ID to specify a manufacturing apparatus, a copyright ID to specify an owner or manager of copyright, and a URL (Uniform Resource Locator) to have an access to a specific web site on the internet associated with the first and the second digital content to be recorded to the optical disc 1. The second recording area 3 is located between the first recording area 2 as the first session and the third recording area 4 as the second session. On the other hand, instead of between the first recording area 2 and the second recording area 4, the second recording area 3 may be located at the lead-in area of the first and the second recording areas 2,4, or the lead-out area of the first and the second recording areas 2, 4.

As explained above, with the optical disc 1, the second digital content is recorded to the third recording area 4 in a higher recording density than that of the first recording area 2, for example, in a doubled recording density. On the other hand, the second digital content may be recorded to the third recording area 4 in the same recording density as that of the first recording area 2. In this case, the optical disc 1 may be configured in the form of a CD-Extra, where data based on the CD format is to be recorded to the inside area and data based on the CD-ROM format is to be recorded to the outside area, or a multi-session type CD having a plurality of recording areas.

Figure 2:
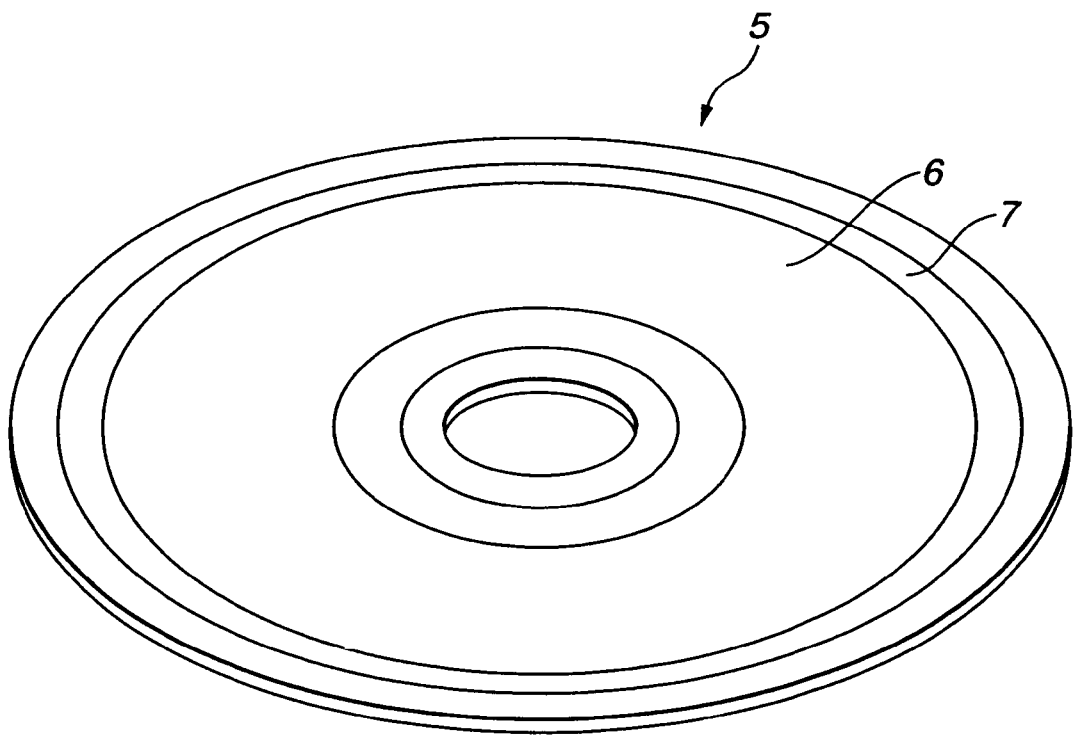
FIG. 2 shows a perspective view of another example of the optical disc according to the present invention.

It is also possible that the optical disc to which the present invention is applied is configured as shown in the FIG. 2. Anoptical disc 5 is a single-session optical disc with one recording area, while the optical disc 1, as explained above, is a double-session optical disc. Specifically, the optical disc 5 has a first recording area 6 covering almost all the area of optical disc 5, and a second recording area 7 which is located at the outside of the first recording area 6 and has identification data recorded thereon. That is, the lead-in area, where TOC (table of contents), etc. is recorded, is located at the inside of the first recording area 6, and a program area, where digital content is to be recorded, is located at the outside of the lead-in area. The second recording area 7, where identification data is to be recorded, is arranged at a part of the lead-out area located at the outside of the program area, for example,.at almost the central part of the lead-out area. Since the second recording area 7 is located at almost the central part of the lead-but area, a reproducing apparatus can read out identification data surely by means of an optical pickup.

Similar to the third recording area 4 of the optical disc 1 explained above, digital content is recorded to the first recording area 6 in the same recording format as that of a CD in a higher recording density than that of the first recording area 2 of the optical disc 1, for example, in a doubled recording density. High quality audio data, signal-compressed still picture data, moving picture data and so on is recorded to the first recording area 6. Identification data, which is inherent in each recording medium, to identify optical discs 5 one by one is recorded to the second recording area 7. The identification data is, similar to the identification data recorded to the optical disc 1, data of a recording medium number used to perform register for distributing the optical disc 5S a manufacturing apparatus ID to specify a manufacturing apparatus, a copyright ID to specify an owner or manager of copyright, and a URL to have an access to a specific web site on the internet associated with the digital content to be recorded to the first recording area 6.

Digital content may be recorded to the first recording area 6 of the optical disc 5 in the same standard recording density as that of a CD.

Figure 3:
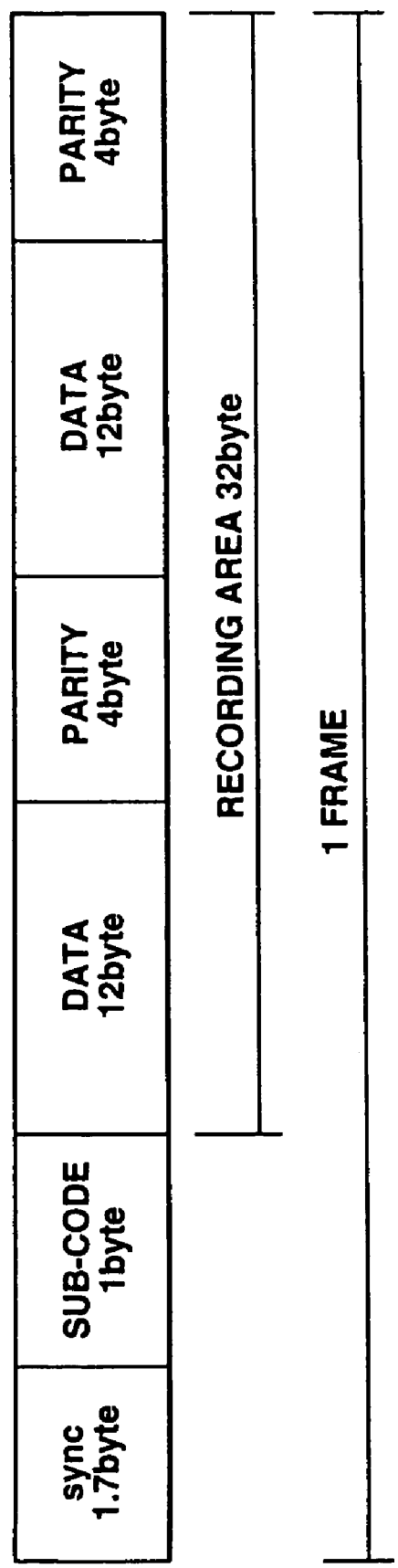
FIG. 3 shows a signal format to be recorded to the optical disc according to the present invention.

As for a recording format to be applied to the optical disc 1 and the optical disc 5 on which the above-mentioned data is recorded, as shown in the FIG. 3, the leading 1.7-byte-portion is for frame synchronization signals, the following 1-byte-portion is for sub-code, and the following 32-byte-portion is recording area. The recording area is comprised of two sets of 12-byte-recording area and following 4-byte-parity. With the optical disc 1, data is recorded in this recording format to the first recording area 2, the second recording area 3, and the third recording area 4. With the optical disc 5, data is also recorded in this recording format to the first recording area 6 and the second recording area 7.

The recording format shown in the FIG. 3 is just one example and the number of bytes and the arrangement in each recording area can be set optionally.

The optical disc 1 and the optical disc 5 are basically read-only recording media, and a pit pattern corresponding to recorded data is formed at the first through the third recording areas 2, 3 and 4 of the optical disc 1, and the first and the second recording areas 6 and 7 of the optical disc 2, respectively. Identification data is electrothermally recorded to a reflective coat on pits or lands at the second recording area 3 of the optical disc 1 and the second recording area 7 of the optical disc 5.

Figure 4:
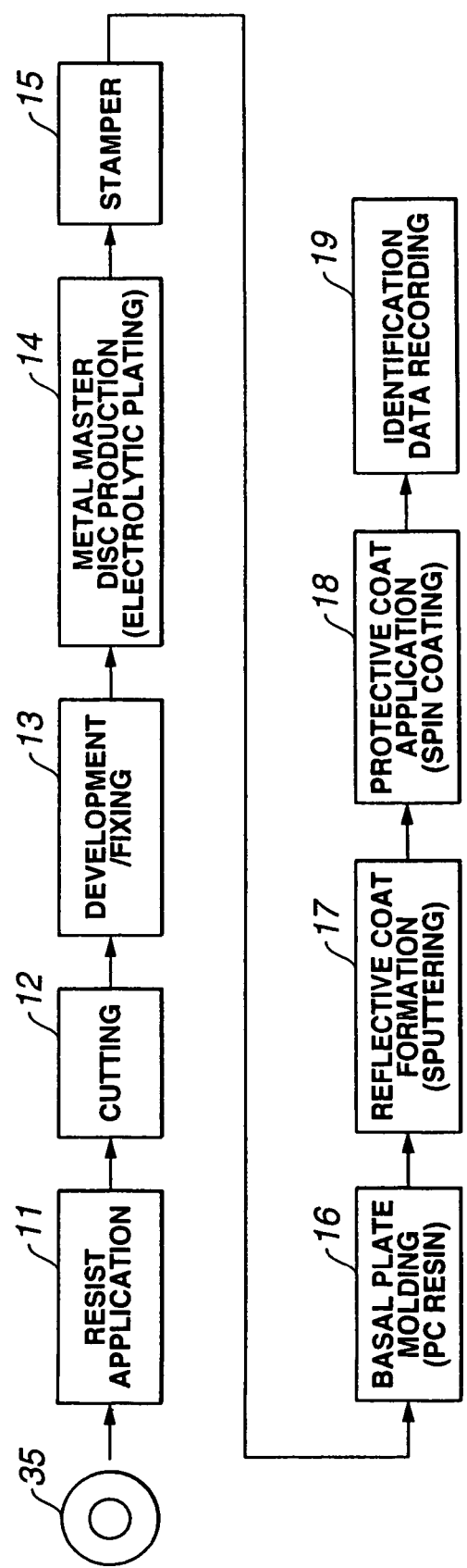
FIG. 4 shows a manufacturing process for the optical disc.

As for a method to manufacture the optical disc 1 and 5, as shown in the FIG. 4, a photo-resist is applied to a glass master disc in the resist application process 11, and a pit pattern of concavo-convex corresponding to data to be recorded is formed by irradiating a laser beam toward the photo-resist in the cutting process 12 to manufacture a master disc. In the next development/fixing process 13, the master disc with the pit pattern formed on it is developed and fixed. Subsequently, in the next metal master disc production process 14, a metal master disc is produced as a mother disc by applying an electrolytic plating to the surface of the master disc. In the next stamper production process 15, a stamper is produced using the metal master disc. In the next basal plate molding process 16, the stamper is attached to a metal mold of the injection molding apparatus, and then a basal plate of transparent resin such as polycarbonate and acrylic is molded using the injection molding apparatus. The pit pattern formed on the master disc in the cutting process 12 are transcribed onto the molded basal plate as the first through third recording area 2, 3 and 4 of the optical disc 1, or as the first and the second recording area 6 and 7 of the optical disc 5. On the surface of the basal plate where the pit pattern is transcribed, signals of the optical disc 1 and 5 are recorded. In the next reflective coat formation process 17, a reflective coat is formed by undergoing sputtering process using a metal target, which will be explained later, on the surface of the basal plate where the pit pattern is transcribed. Identification data is recorded electrothermally to the second recording area 3 and 7 of the optical disc 1 and 5, respectively, utilizing the reflective coat.

The reflective coat used for the optical disc 1 and 5 is required to be made of material to which identification data can be recorded. Therefore, the reflective coat used for the optical disc 1 and 5 is made of material having the same reflectance as that of the reflective coat of a CD or a DVD, or having the reflectance with which a conventional optical head can reproduce data. And at the same time, when performing the electrothermal recording using an optical beam, the reflective coat is required to be made of material whose reflectance changes when a optical beam for reproducing data is irradiated thereto. Specifically, by electrothermal recording using an optical beam, the reflective coat is made of a metal coat having a reflectance changing from around 0.5% or more to 10% or less when a optical beam for reproducing data is irradiated thereto. Specifically, the reflective coat is made of aluminum alloy which is made by alloying aluminum with a slight amount of germanium.

In the protective coat application process 18, an ultraviolet hardening resin is applied to the reflective coat by spin coating, and a protective coat is formed by irradiating an ultraviolet to the ultraviolet hardening resin. Data recorded on the optical disc 1 and 5 respectively molded in this way is reproduced by irradiating an optical beam from the side opposite to the surface of the optical disc where the protective coat is formed. In the next identification data recording process 19, identification data is recorded to the optical disc 1 and 5 by electrothermal recording respectively by a laser beam for recording data to the second recording areas 3 and 7 of the optical disc 1 and 5 respectively, that is, a laser beam which has the same wave length as that for reproducing data recorded on the optical disc 1 and 5 and has a higher output level than that for reproducing data. In the event that an identification data to be recorded is data of a recording medium number used to perform register for distributing the optical disc 1 and 5, a copyright ID to specify an owner or manager of copyright, and a URL, such identification data is recorded by its distribution source, and in the event that an identification data to be recorded is a manufacturing apparatus ID, such identification data is recorded by its manufacturing source. Further, in the event that a user can record his/her identification data, the identification data is recorded by using his/her recording apparatus.

Figure 5:
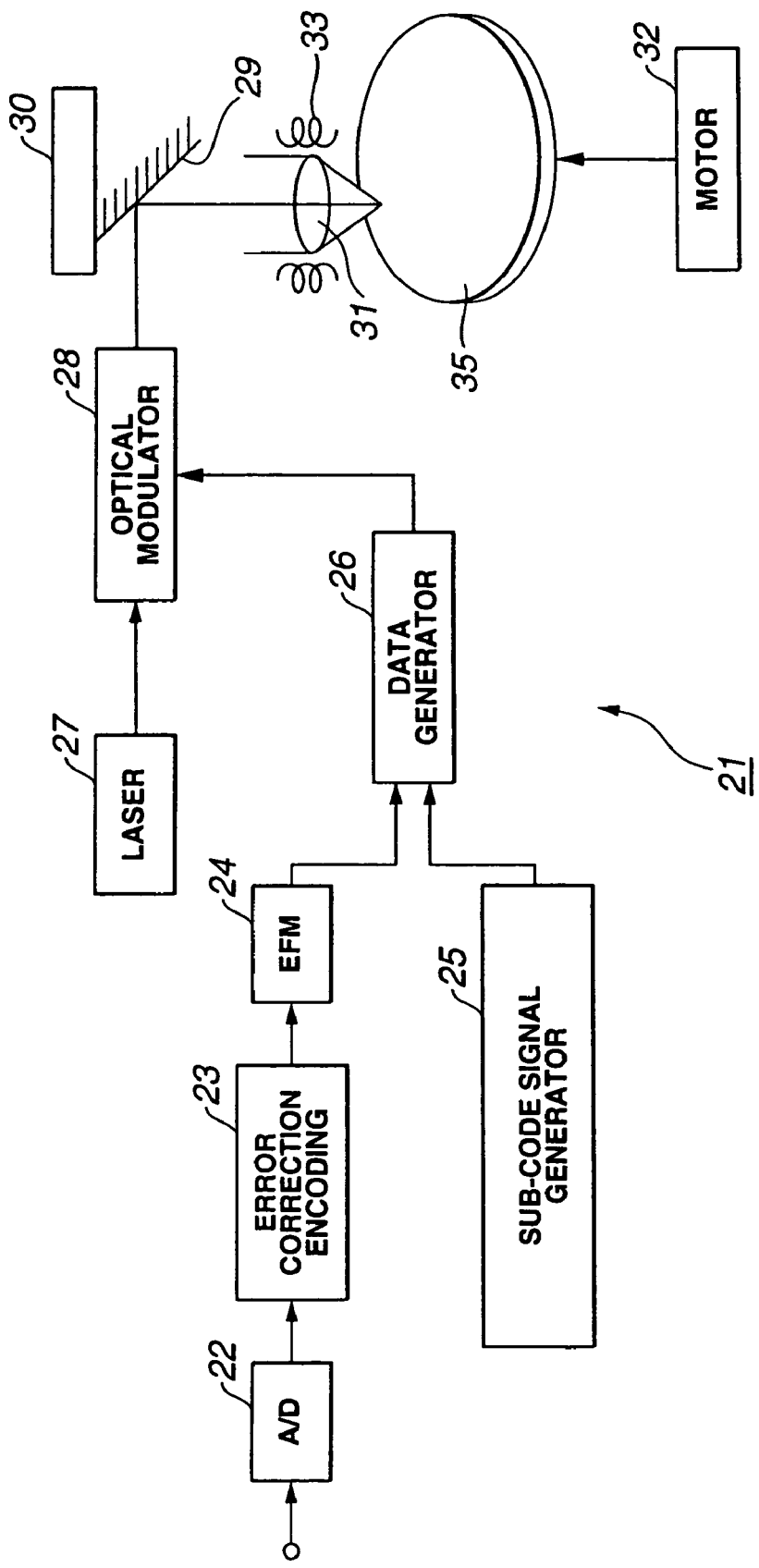
FIG. 5 shows a cutting apparatus to manufacture a stamper.

As for the cutting apparatus 21, which is used to produce a master disc by forming a pit pattern of concavo-convex corresponding to data to be recorded through a laser cutting toward the photo-resist in the cutting process 12, the cutting apparatus 21 includes, as shown in the FIG. 5 for example, an A/D converter 22 into which sampled data to be recorded is input, an error correction encoding circuit 23 which implements error correction encoding to digital signals sent from the A/D converter 22, a modulator 24 to modulate encoded output, a sub-code signal generator 25 to generate sub-code signals, and a data generator 26 which adds output data from the modulator 24 to output data from the sub-code signal generator 25 to generate recording data. Furthermore, the cutting apparatus 21 includes a laser source 27 which irradiates a laser beam, an optical modulator 28 which modulates a laser beam based on the data generated from the data generator 26, a reflective mirror which reflects a modulated laser beam, a movable unit 30 which moves the reflective mirror 29, an objective lens 31 which condenses a laser beam and irradiates it toward a photo-resist on the glass master disc 35, a motor 32 which rotates the glass master disc 35, and an objective lens drive unit 33 which changes the position of the objective lens 31 toward a focusing direction, that is, an optical axis of the objective lens 31.

The error correction encoding circuit 23 implements, for example, encoding of a combination of cross interleave and forth read-solomon codes for sampled data of analogue digital content by using an algorithm of CIRC (Cross Interleave Reed-solomon Code) and generates the resulting data to the modulator 24.

The modulator 24 modulates, for example, encoded output from the error correction encoding circuit 23 in accordance with an algorithm of EFM (Eight to Fourteen Modulation) and generates the resulting data to the data generator 26. Specifically, the modulator 24 sets the minimum run-length (the minimum inversion interval Tmin) to 2 and the maximum run-length (the maximum inversion interval Tmax) to 10 in accordance with the EFM conversion tables shown in the FIG. 6 and the FIG. 7 respectively to convert an 8 bit code sequence into a 14 bit recording code sequence. At this time, the modulator 24 inserts a 3 bit coupling code between blocks of 14 bit recording code sequences. In other words, the modulator 24 converts a recording code sequence into a 17 bit code sequence. A modulating mode may be 8-16 modulation, not limited to the EFM.

By the above-mentioned modulating mode, the modulator 24 modulates the first digital content to be recorded to the first recording area 2 of the optical disc 1 and the. second digital content to be recorded to the third recording area 4 of the optical disc 1 and sends the modulated data to the data generator 26. The modulator 24 modulates the first digital content to be recorded to the first recording area 6 of the optical disc 5 and sends the modulated data to the data generator 26. In addition, the modulator 24 converts data to be recorded to the second recording area 3 located between the first recording area 2 and the third recording area 4 of the optical disc 1 and data to be recorded to the second recording area 7 of the optical disc 5, that is, converts the 25th data of [00011001] in a decimal number system shown in FIG. 6 into [10000000010000], and sends the modulated data to the data generator 26. In the second recording area 3 of the optical disc 1 and the second recording area 7 of the optical disc 5, a pit pattern of [10000000010000] is formed repeatedly over 20 to 40 μm along the radial direction.

For the above-mentioned laser source 27, gas laser such as argon laser and He—Cd laser is-used. In the optical modulator 28, EOM (Electrical Optical Modulator). using a Pockels effect or AOM (Acoustic-Optical Modulator) using a supersonic wave are employed.

In the above-mentioned cutting apparatus 21, once sampled data to be recorded is input into the A/D converter 22, the A/D converter 22 converts the analogue signal data to digital data and sends it to the error correction encoding circuit 23, and then the error correction encoding circuit 23 implements encoding of a combination of cross interleave and the forth read-solomon codes against the sampled data and sends the encoded data to the modulator 24. The modulator 24 modulates data in the EFM mode. In other words, in accordance with the EFM conversion table shown in the FIGS. 6 and 7, the modulator 24 modulates the first digital content to be recorded to the first recording area 2 of the optical disc 1, the 25th data in decimal number system in the EFM conversion table to be recorded to the second recording area 3 and the second digital content to be recorded to the third recording area 4 in the EFM mode and sends the modulated data to the data generator 26. The modulator 24 modulates the digital content to be recorded to the first recording area 6 of the optical disc 5 and the 25th data in a decimal number system in the EFM conversion table to be recorded to the second recording area 7 of the optical disc 5 in accordance with an algorithm of EFM shown in the EFM conversion tables in the FIG. 6 and the FIG. 7, and sends the modulated data to the data generator 26. The data generator 26 forms recording data by adding the data from the modulator 24 and the sub-code data from the sub-code signal generator 26 and sends the recording data to the optical modulator 28.

The laser source 27 irradiates a laser beam and the laser beam is input into the optical modulator 28. The optical modulator 24 modulates the laser beam in accordance with the input data from the data generator 26. In other words, at the time that data is recorded to the first recording area 2 and the second recording area 3 of the optical disc 1, the optical modulator 28 modulates the laser beam in a standardized recording density, that is, in the same recording density as that of a conventional CD, and at the time that data is recorded to the third recording area 4, a deflecting angle of the mirror 29 to change the direction of the light path of the laser beam or a relative movement of the laser spot on the photo-resist relative to the glass master disc 35 is controlled so that a recording density can be higher, for example, twice higher than the case in the first recording area 2 and the second recording area 3. The optical modulator 28 modulates the laser beam in accordance with the output data from the optical modulator 28 at the time that data is recorded to the first recording area 5 or the second recording area 6 of the optical disc 5.

The laser beam modulated by the optical modulator 28 is irradiated into the mirror 29. The mirror 29 is moved by the movable unit 30 so that the laser beam can scan along from the inside to outside of the glass master disc. The laser beam which has its light path direction changed by the mirror 29 is condensed by the objective lens 31 and irradiated to the photo-resist over the glass master disc 35 rotated by the motor 32 which is a rotary drive unit. At this time, the position of the objective lens 31 is changed toward the light path of the laser beam by the objective lens drive unit 33 and the focusing of the objective lens is adjusted so that the laser beam is condensed to the photo-resist on the glass master disc 35.

A stamper is formed in accordance with the process shown in the FIG. 4, based on the glass master disc 35 molded in the above-mentioned cutting apparatus 21. On the optical disc 1 having a protective coat formed on its surface, a pit pattern corresponding to the first digital content is formed in the first recording area 2, a pattern included in the modulated pattern of the data recorded to the first recording area 2, that is, a pit pattern based on the 25th modulated pattern shown in the FIG. 6, is formed in the second recording area 3 at the outside of the first recording area 2, and a pit pattern corresponding to the second digital content in a higher recording density than that of the first recording area 2, for example, in a doubled recording density, is formed in the third recording area 4. On the optical disc 5, a pit pattern corresponding to the digital content in a higher recording density than that of the first recording area of the optical disc 1, for example, in a doubled recording density, is formed in the first recording area 6, and a pattern included in the modulated pattern of the data recorded to the first recording area 6, that is, a pit pattern based on the 25th modulated pattern shown in the FIG. 6, is formed in the second recording area 7 at, the outside of the first recording area 6.

Figures 8A, 8B:
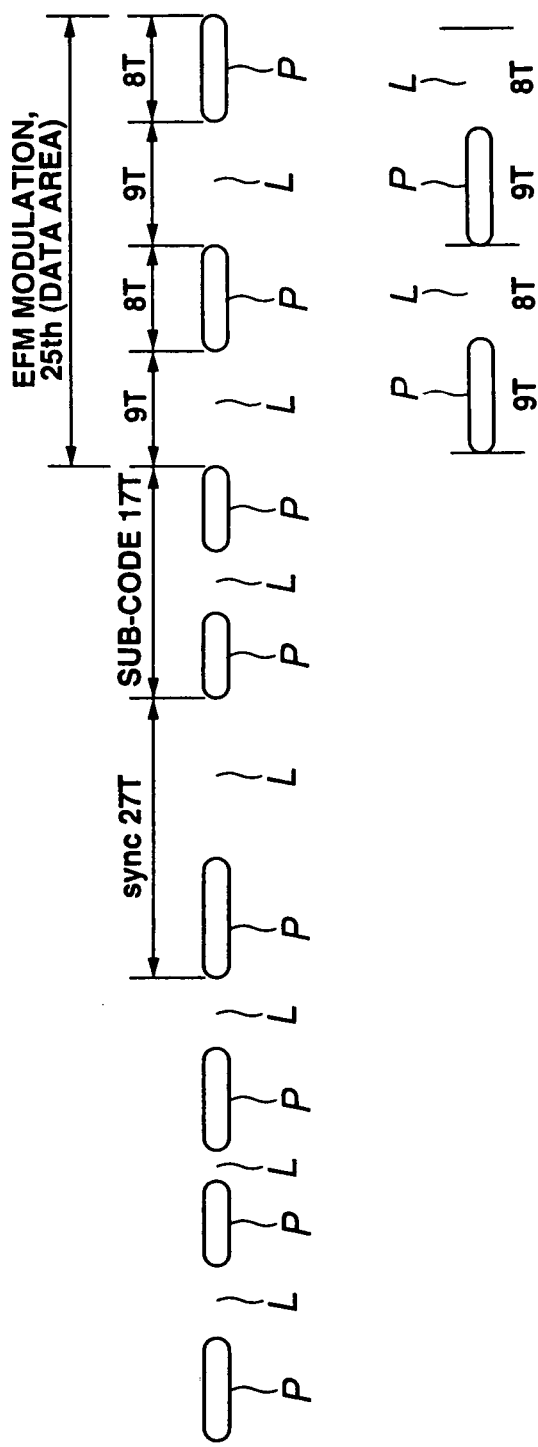
FIGS. 8A and 8B show a pit pattern of a second recording area where identification data is to be recorded.

Specifically, as shown in the FIG. 8A, a frame synchronization signal with a pit interval of 27 T by inserting 3 bit coupling code to the frame synchronization signal, a sub-code signal at a pit interval of 17 T by inserting 3 bit coupling code to the sub-code signal, and thereafter a data area with a pit interval of 34 T are formed in the second recording area 3 of the optical disc 1 and the second recording area 7 of the optical disc 5. This data area is set by inserting a coupling code of [000] pattern to a 25th pattern [10000000010000] in decimal number system in the EFM conversion table as shown in the FIG. 6, and its pit interval is 9 T and 8 T. As shown in the FIG. 8A, a pit portion P which is concave corresponding to the data, and a land portion L in sequence following the pit portion P are formed in the second recording area 3 of the optical disc 1 and the second recording area 7 of the optical disc 5. As shown in the FIG. 8B, a land portion L of 8 T following a pit portion P of 9 T may be formed in the data area.

On the optical disc 1, another pit pattern corresponding to the second digital content in a higher recording density than that of the first recording area 2 and that of the second recording area 3, for example, in a doubled recording density, is formed on the outside of the second recording area 3. On the optical disc 5, a pit pattern corresponding to the digital content in a higher recording density than that of the first recording area 2 of the optical disc 1, for example, in a doubled recording density, is formed in the first recording area 6, and such a pit pattern as shown in the FIGS. 8A and 8B is formed in the second recording area 7 on its outside. These optical disc 1 and 5 can be manufactured in the same manner as the CD to be manufactured to record identification data to the second-data area 3 and 7 respectively.

A pattern to be formed in the second recording area 3 and 7 is not limited to the. 25th data pattern on decimal number system, and it may be other pattern not exceeding 11 T included in the EFM conversion table or other pattern not included in the EFM conversion table. If it is not the EFM mode, a pit pattern may be formed using variables not exceeding 2 T, or 12 T or more. Furthermore, as shown in the FIG. 9, a pattern to be formed in the second recording area 3 and 7 may be a repeated combination of pit portion P and land portion L with the same length without inserting frame synchronization signal or sub-code. In this case, the length of the pit portion P and the land portion L is, for example, 3 T. Certainly, the length may be 2 T or 6 T, which is longer than 3 T. In addition, it may be a pattern to be formed in the second recording area 3 and 7 where only pit portion P is the same in length or only land portion L is the same in length without inserting frame synchronization signal or sub-code. Namely, it should be in such a length as any edge of output signals can be detected, and the longer it is, the easier it is to detect edges.

The optical disc 1 and 5, where any identification data is not yet recorded to the second recording area 3 and 7 respectively, for example, are shipped from its manufacturer to the distribution sources, and identification data such as data of a recording medium number used to perform register for- distributing the optical disc 1 and 5, a copyright ID to specify an owner or manager of copyright, and a URL (Uniform Resource Locator) to have an access to a specific web site on the internet associated with the digital content to be recorded to the optical disc 1 and 5 is recorded electrothermally onto the reflective coat on the pit pattern formed in the second recording area 3 by the distribution sources. Namely, if the manufacturing apparatus ID as identification data is recorded to the second recording area 3 and 7, the identification data may be recorded electrothermally onto the reflective coat by the manufacturer's sources.

Figure 10A:
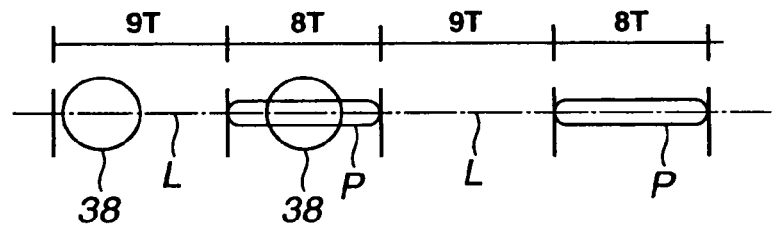
FIGS. 10A and 10B show a state in which identification data is recorded on the pit pattern shown in FIG. 8A and 8B.

In thus configured second recording area 3 and 7 of the optical disc 1 and 5 respectively, as shown in the FIG. 10A, pits 38 forming identification data is recorded both to the 8 T pit portion P on the recording track in accordance with the 25th pattern in the EFM conversion table, and to the following 9 T land portion L. The identification data is recorded by heating up the protective coat on the optical disc 1 and 5 by irradiating a laser beam with higher output power than that at playback operation toward pit portion Ps and land portion Ls which configures the data area of the second recording area 3 and 7, to physically change the reflective coat and the basal plate such that physically changed portions of the reflective coat and the basal plate have the same optical characteristics as those of the pit portion P. Namely, the identification data D may be recorded only to the pit portion Ps or only to the land portion Ls. If the length of the recorded pit 38 is, for example, 3 T or longer, the length of the remaining land portion Ls or pit portion Ps shall be also 3 T or longer. As a result, it can prevent the recorded pit 38, the remaining pit portion Ps and land portion Ls from being out of specification and unable to be reproduced.

Figure 10B:
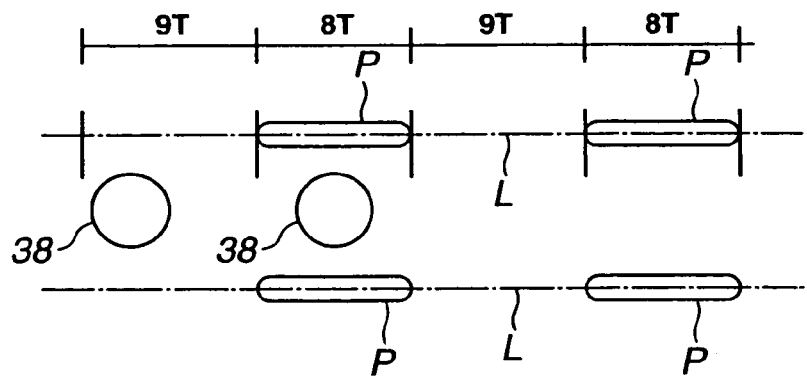

The example shown in the FIG. 10A is the case in which the identification data is recorded to the recording track, but the identification data may be recorded between the recording tracks as shown in the FIG. 10B.

Furthermore, the identification data may be recorded, as shown in the FIG. 11A, by recording the pit 38 forming the identification data over the multiple pit portion Ps and multiple land portion Ls on the recording track. In this case, the length of the pit 38 forming the identification data is, for example, 147 T, and the pit 38 is recorded irrespective of the pit pattern of repeated 3 Ts. The identification data is recorded to the pit pattern of repeated 3 Ts by irradiating a laser beam with high output power so as to electrothermally record a pit with the length of 147 T if the identification data is [1], and by irradiating a normal laser beam of the length of the 147 T so as not to electrothermally record a pit if the identification data is [0]. The length of the identification data, for example, may equal to the number of channel bits for one frame in the EFM, that is, the number which can be divided by 588 bits, then it is not limited to 147 T and may be, for example, 49 T, 84 T, 98 T, 196 T and so on.

The identification data may be recorded between the recording tracks as. shown in the FIG. 11B. The Identification data may be recorded by recording the long pit 38 over the multiple pit portion Ps and multiple land portion, Ls consisting of the pit portion P of 8 T and the land portion L of 9 T subject to the 25th pattern in the EFM conversion table as shown in the FIG. 10A.

Meanwhile, the identification data is recorded to the second recording area 3 and 7 in a different mode from that of the EFM. For example, in the event that NRZ (Non Return to Zero) modulation or NRZI (Non Return to Zero Inverted) modulation is applied, the identification data is recorded to the second recording area 3 and 7 by irradiating the laser beam with high output power toward the land portion Ls and /or the pit portion Ps if the data to be recorded is [1], and by not irradiating the laser beam with high output power if the data to be recorded is [0]. On the contrary, the identification data may be recorded to the second recording area 3 and 7 by irradiating the laser beam with high output power toward the land portion Ls and /or the pit portion Ps if the data to be recorded is [0], and by not irradiating the with high output power laser beam if the data to be recorded is [1].

When PE (Phase Encoding) modulation is applied, the identification data is recorded to the second recording area 3 and 7 by irradiating the PE modulated laser beam with high output power toward the land portion Ls and /or: the pit portion Ps if the data to be recorded is [1], and by not irradiating the laser beam with high output power if the data to be recorded is [0]. On the contrary, the identification data may be recorded to the second recording area 3 and 7 by irradiating the PE modulated laser beam with high output power toward the land portion Ls and /or the pit portion Ps if the data to be recorded is [0], and by not irradiating the laser beam with high output power if the data to be recorded is [1].

Additionally, when FM (Frequency Modulation) is applied, the identification data is recorded to the second recording area 3 and 7 by irradiating the laser beam with high output power toward the land portion Ls and /or the pit portion Ps so that the frequency of changes in the RF signals would be 1.1 MHz if the data to be recorded is [1], and by irradiating the laser beam with high output power so that the frequency of changes in the RF signals would be 1.3 MHz if the data to be recorded is [0].

When a combination of the PE modulation and the FM modulation, the identification data is recorded to the second recording area 3 and 7 by irradiating the PE modulated laser beam with high output power toward the land portion Ls and /or the pit portion Ps so that the frequency of changes in the RF signals would be 1.1 MHz if the data to be recorded is [1], and by irradiating the PE modulated laser beam with high output power so that the frequency of changes in the RF signals would be 1.3 MHz if the data to be recorded is [0].

Figure 12:
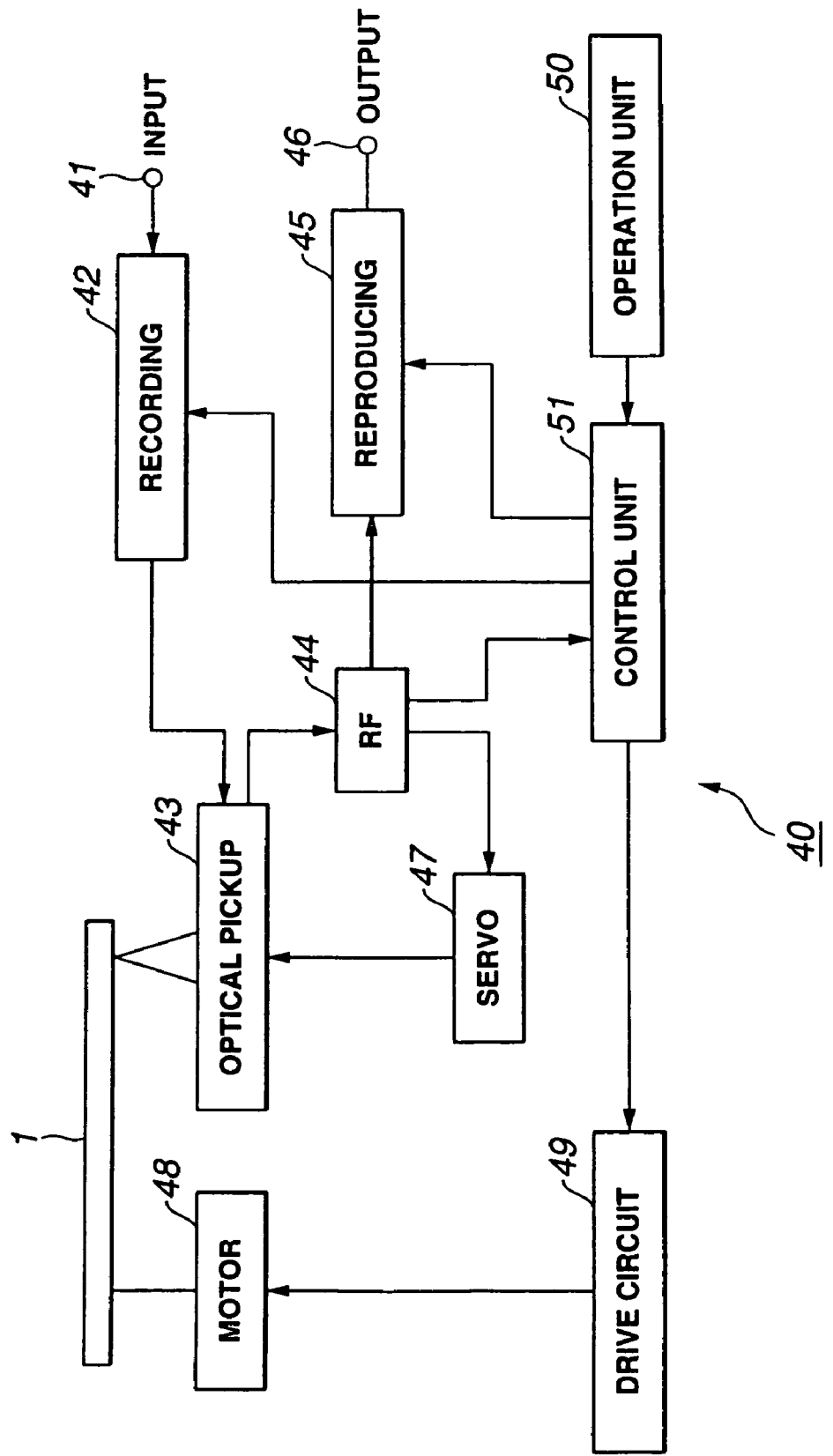
FIG. 12 shows a block diagram of an optical disc recording and/or reproducing apparatus according to the present invention.

A recording and/or reproducing apparatus 40 which can record identification data to the optical disc 1 and 5 and reproduce data recorded on the optical disc 1 and 5 includes a recording circuit 42 which records the identification data input from a input terminal 41, an optical pickup 43 which not only records the identification data by irradiating the laser beam toward the-second recording area 3 and 7 of the optical disc 1 and 5 respectively in accordance with the output from the recording circuit 42 but also reads out the data, a FR circuit 44 into which the output data from the optical pickup 43 is entered, a reproducing circuit 45 which implements a reproducing process to the data from the RF circuit 44 and sends the data to an output terminal 46, a servo circuit 47 which generates a focusing control signal and a tracking control signal of the objective lens in accordance with the data from the RF circuit 44, a drive unit motor 48 which rotates the optical disc 1 and 5, a drive circuit 49 which controls the drive unit motor 48, an operation unit 50 which generates an operational signal upon an operation by a user, and a control circuit 51 which controls a overall operation in accordance with the operation signals, as shown in the FIG. 12.

When an identification data is input from the input terminal 41, then the recording circuit 42 samples the identification data and implements an error correction encoding. Following that, the recording circuit 42 modulates the data after the error correction encoding in the above-mentioned modulation modes such as NRZ modulation, NRZI modulation, PE modulation, FM modulation, a combination of PE modulation and FM modulation and outputs the data to the optical pickup 43.

The optical pickup 43 includes a semiconductor laser which irradiates a laser as an optical beam, an objective lens which condenses the irradiated laser beam from the semiconductor laser, and an optical detector which detects the return laser beam reflected on the optical disc 1 and 5. The laser beam irradiated from the semiconductor laser is condensed by the objective lens and irradiated to the signal recording surface of the optical disc 1. At this point, the semiconductor laser irradiates. the laser beam to the extent that it is necessary to reproduce the data and that no changes are made in the reflective coat when the digital content in the first and the third recording area 2 and 4 respectively of the optical disc 1 or in the first recording area 6 of the optical disc 5 are reproduced. The semiconductor laser modulates the laser beam based on the identification data so that the identification data of a plurality of pits could be electrothermally recorded on the reflective coat in the second recording area 3 and 7 of the optical disc 1 and 5 respectively and irradiates a stronger optical beam than that at playback operation when the identification data is recorded.

The laser beam reflected on the signal recording surface of the optical disc 1 and 5 is detected by the optical detector, and the optical detector converts optical data to an electrical signal to sends the electrical signal to the RF circuit 44. The objective lens is supported on an objective lens drive unit such as a biaxial actuator, and the position of the objective lens is changed by the objective lens drive unit toward the focusing direction parallel to the optical axis of the objective lens and toward the tracking direction perpendicular to the optical axis of the objective lens in accordance with an error signal, which will be described later, generated from the output signal from the optical detector.

The RF circuit 44 generates a RF signal, a focusing error signal and a tracking error signal based on the output signal from the optical detector of the optical pickup 43. For example, the focusing error signal is generated in a so-called Astigmatic method, and a tracking error signal is generated in a so-called Three-beam method or a Push-pull method. The RF circuit 44 sends the RF signals to the reproducing circuit 45, and sends the focusing error signals and the tracking error signals to the servo circuit 47.

The servo circuit 47 generates a servo signal which is used in changing the position of the objective lens along the focusing direction and the tracking direction. Specifically, the servo circuit 47 generates the focusing servo signals in accordance with the focusing error signals provided from the RF circuit 44 so that the focusing error signals become 0, and generates the tracking servo signals in accordance with the tracking error signals provided from the RF circuit 44 so that the tracking error signals become 0. The servo circuit 47 sends these focusing servo signals and the tracking servo signals to the drive circuit of the objective lens drive unit of the optical pickup 43. This drive circuit controls the drive unit of the objective drive unit, which activates the objective lens, in accordance with the-focusing servo signals and the tracking servo signals. In other words, the drive circuit drives the biaxial actuator being the drive unit of the objective lens according to the focusing servo signals and changes the position of the objective lens toward the focusing direction parallel to the optical axis of the objective lens as well as drives the biaxial actuator according to the tracking servo signals and changes the position of the objective lens toward the tracking direction perpendicular to the optical axis of the objective lens.

The reproducing circuit 45 detects any changes in the RF signals sent from the RF circuit 44 and set them to be binary data when reproducing the first and the second digital content recorded on the first and the third recording area 2 and 4 respectively of the optical disc 1, or the digital content recorded on the optical disc 5. The reproducing circuit 45 then demodulates thus generated binary data in the EFM method, performs correction for data demodulated in the EFM method in CIRC method and sends them to the output terminal 46.

Figure 9:
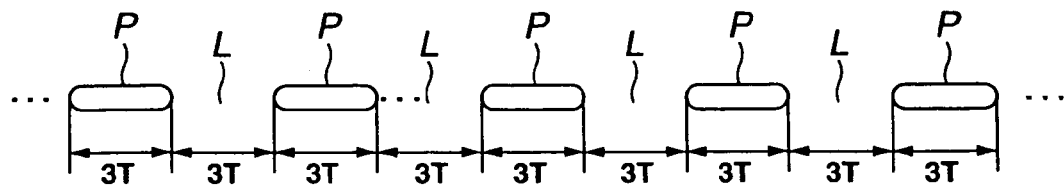
FIG. 9 shows another example of a pit patter of the second recording area where identification data is to be recorded.

The reproducing circuit 45 detects changes in the RF signal level in accordance with the pattern electrothermally recorded by the optical beam with higher output power toward the RF signals which varies according to the pit pattern arranged in the second recording area 3 and 7, that is, the pit pattern set in 9 T or 8 T cycle as shown in the FIG. 8 or the pit pattern set in the repeated 3 T cycle as shown in the FIG. 9 and set them to be binary data when reproducing identification data recorded to the second recording area 3 of the optical disc 1 or in the second recording area, 7 of the optical disc 6. The reproducing circuit 45 demodulates the binary data in the method corresponding to the modulation mode applied to the binary data in the recording circuit 42, and performs correction and then sends them to the output terminal 46 or the control unit 51.

The drive circuit 49 controls the drive motor 48 so that the linear velocity would become constant depending on the position of the optical pickup 43 moving over the optical disc 1 and 5, along the radial direction thereof. For example, the drive circuit 49 activates the drive motor 48 so that the linear velocity would become 1.2 m/sec. when it reads out the data in the first recording area 2 of the optical disc 1, and activates the drive motor 48 so that the linear velocity would become 0.9 m/sec. when it reads out the data in the third recording area 4 of the optical disc 1 or in the first recording area 6 of the optical disc 5. In addition, the drive circuit 49 may control the drive unit of the drive motor 48 so that the rotational frequency of the optical disc 1 and 5 would become constant.

The operation unit 50 is set up on the main unit of the recording and/or reproducing apparatus, which includes a recording button to record the identification data to the second recording area 3 and 7 of the optical disc 1 and 5 respectively, a playback button to reproduce the first and the second digital content recorded on the optical disc 1 or the digital content recorded on the optical disc 5, a forward direction track jump button to track jump in the forward direction, an inverse direction track jump button to track jump in the inverse direction and a stop button to stop the playback operation. These operational buttons send the operation signals corresponding to the operation of the buttons by a user of the recording and/or reproducing apparatus, and the operation signals are sent to the control unit 51.

The control unit.51 controls the operation of the entire apparatus in accordance with the operation signals sent from the operation unit 50. In other words, the control unit 51 controls the recording circuit 42, the optical pickup 43 and so on in order to record the identification data to the second recording area 3 and 7 of the optical disc 1 and 5 respectively when the recording button is pressed by a user. The control unit 51 controls the reproducing circuit 45, the optical pick 43 and so on when the playback button is operated and the first and the second digital content recorded on the optical disc 1 or the digital content recorded on the optical disc 5 is reproduced. Furthermore, the control unit 51 suspends the playback operation of the first and the second digital content recorded on the first and the third recording area 2 and 4 of the optical disc 11 or the digital content recorded to the first recording area 6 of the optical disc 5 when playback operation is implemented by a user and the identification data recorded on the second recording area 3 and 7 of the optical disc 1 and 5 respectively cannot be detected.

The next section will explain an operation to record the identification data to the second recording area 3 and 7 of the optical disc 1 and 5 respectively by the recording and/or reproducing apparatus 40 configured as described above.

When the recording button is pressed by a user, the drive circuit 49 controls the drive motor 48 and the rotation of the optical disc 1 and 5 so that the optical disc 1 would be rotated at the constant linear velocity. At the same time, the optical pickup 43 scans the first through the third recording area 2, 3 and 4 by irradiating the optical beam over the first through the third recording area 2, 3 and 4 when the optical disc 1 is loaded in the optical disc drive. The optical pickup 43 also scans the first and the second recording area 6 and 7 by irradiating the optical beam over the first and the second recording area 6 and 7 when the optical disc 5 is loaded in the optical disc drive. The control unit 51 specifies the second recording area 3 and 7 to record the identification data by detecting any changes in the RF signal level which is sent from the RF circuit 44.

At the same time, when the identification data is sent from external devices such as computers connected to the input terminal 41, the recording circuit 42 samples the identification data, makes error correction encoding, modulates the data in NRZ modulation, NRZI modulation, PE modulation, FM modulation and a combination of the PE modulation and the FM modulation modes and sends the data to the optical pickup 43 so that the identification data could be recorded to the second recording area 3 of the optical disc 1. A pattern corresponding to the identification data is electrothermally recorded by the optical pickup 43 to the reflective coat on the pit pattern in the second recording area 3 and 7 of the optical disc 1 and 5 respectively, as shown in the FIGS. 10A and 10B or the FIGS. 11A and 11B, by switching over the output power level of the optical beam to be irradiated from the semiconductor laser to a higher level at recording than that at playback operation in accordance with the input data provided from the recording circuit 42.

At the time the identification data is recorded, the return optical beam reflected on the signal recording surfaces of the optical disc 1 and 5 is detected by the optical detector, converted into the electrical signals and the electrical signals out of the optical detector is sent to the RF circuit 44 as output signals. The RF circuit 44 generates the focusing error signals and the tracking error signals in accordance with the signals obtained from the pit pattern arranged in the second recording area 3 and 7 in 9 T, 8 T and 3 T, 3 T cycles and sends them to the servo circuit 47. The servo circuit 47 generates the focusing servo signals in accordance with the provided focusing error signals and also generates tracking servo signals in accordance with the tracking error signals and then sends these error signals to the drive circuit of the objective lens drive unit of the optical pickup 43. Focusing is controlled through controlling the position of the objective lens toward the direction of the optical axis of the optical beam by the objective lens drive unit in accordance with the focusing servo signals, and tracking error is controlled through controlling the position of the objective lens toward the direction perpendicular to the optical axis of the optical beam by the objective lens drive unit in accordance with the tracking servo signals. Namely, the pit pattern in 9 T, 8 T and 3 T, 3 T cycles arranged in the second recording area 3 and 7 is used only for focusing and tracking controls, and therefore, it is not valuable data for users who reproduce data recorded on the optical disc 1 or 5. The optical disc 1 with the identification data recorded to the second recording area 3 and 7 is sold to users at distribution dealers, for example.

The next section will explain an operation to reproduce the identification data and the first and the second digital content recorded on the optical disc 1.

When a playback button is pressed by a user, the drive circuit 49 controls the drive motor 48 so that the linear velocity of the optical disc 1 and 5 would become constant. At the same time, the optical pickup 43 irradiates the optical beam over the signal recording surfaces of the optical disc 1 and 5. The return optical beam reflected on the signal recording surface of the optical disc 1 and 5 is detected by the optical detector, and converted into the electrical signals, and the electrical signals from the optical detector is sent to the RF circuit 44. The RF circuit 44 generates the RF signals and sends them to the reproducing circuit 45 as well as generates the focusing error signals and the tracking error signals and sends them to the servo circuit 47.

When the identification data recorded to the second recording area 3 and 7 of the optical disc 1 and 5 is reproduced respectively, the reproducing circuit 45 detects any changes in the RF signal level in accordance with the pattern electrothermally recorded by the optical beam with higher output power toward the RF signals which tend to be varied according to the pit pattern arranged in the; second recording area 3 and 7 in 9 T, 8 T and 3 T, 3 T cycles, and set them to be binary data. The reproducing circuit 45 demodulates the binary data in the mode corresponding to the modulation mode applied to the data in the recording circuit 42 and makes error corrections and then sends them to the output terminal 46 or the control unit 51.

When the identification data recorded to the second recording area 3 and 7 of the optical disc 1 and 5 respectively is reproduced, the RF circuit 44 generates the focusing error signals and the tracking error signals, in accordance with the signals obtained from the pit pattern arranged in the second recording area 3 and 7 in 9 T, 8 T and 3 T, 3 T cycles and sends them to the servo circuit 47. The servo circuit 47 generates the focusing servo signals in accordance with the provided focusing error signals and also generates tracking servo signals in accordance with the provided tracking error signals and then sends these error signals to the drive circuit of the objective lens drive unit of the optical pickup 43. Focusing is controlled through controlling the position of the objective lens toward the direction of the optical axis of the optical beam by the objective lens drive unit in accordance with the focusing servo signals, and tracking error is controlled through controlling the position of the objective lens toward the direction perpendicular to the optical axis of the optical beam by the objective lens drive unit in accordance with the tracking servo signals. Therefore, the recording and/or reproducing apparatus 40 can reproduce the identification data recorded to the second recording area 3 and 7 of the optical disc 1 and 5 respectively.

When the digital content recorded on the first recording area 2 or the third recording area 4 of the optical disc 1, or the digital content recorded on the first recording area 6 of the optical disc is reproduced, the reproducing circuit 45 detects any changes in the RF signals generated out of the RF circuit 44 according to the pit pattern arranged in the first recording area 2 or the third recording area 4 of the optical disc 1, or in the first recording area 6 of the optical disc 5, and set them to be binary data. The reproducing circuit 45 then demodulates thus generated binary data in the EFM method, performs correction for data demodulated in the EFM method in CIRC method and sends them to the output terminal 46.

The control unit 51 first determines whether or not the identification data is recorded on the second recording area 3 when the first and the second digital content recorded on the first and the third recording area 2 and 4 of the optical disc 1 is reproduced, and then if the identification data is not detected, the control unit 51 suspends the playback operation of the second digital content recorded to the third recording area 4, or may suspends the playback operation of the first and the second digital content recorded to the first and the second recording area 2 and 4 respectively. The control unit 51 first determines whether or not the identification data is recorded on the second recording area 7 when the digital content recorded on the first recording area 6 of the optical disc 5 is reproduced, and then if the identification data is not detected, the control unit 51 may suspends the playback operation of the digital content recorded to the first recording area 6. Therefore, the recording and/or reproducing apparatus 40 can suspend the playback operation of the optical disc 1 and 5 illegally produced. For example, in order to determine whether or not the identification data is recorded on the second recording area 7 or not, if only 9 T or 8 T data is detected from the data reproduced from the optical disc 5 as shown in the FIG. 8A, it is considered that the identification data is not detected.

As described above, the optical disc 1 and 5 can be controlled: without fail by recording the identification data to the second recording area 3 and 7. The recording and/or reproducing apparatus 40 of the optical disc 1 and 5 in such a manner can record and reproduce the identification data with stability when the identification data recorded to the second recording area 3 and 7 is reproduced since the pit pattern arranged in the second recording area 3 and 7 can be used.

Since the optical disc 1 has the second recording area for recording the identification data between the first recording area 2 and the third recording area 4, the control over the optical pickup 43 can be implemented easier, comparing to the case where a record area to record the identification data is available on the innermost or outermost of the optical disc 1, and the identification data is surely reproduced.

As for the optical disc 5, since the second recording area 7 to record the identification data is available at almost central area in the lead-out area, the control over the optical pickup 43 can be implemented easier and the identification data is surely reproduced. Namely, the optical disc 5 can more certainly specify the position of the second recording area 7 by arranging the second recording area 7 at almost central area in the lead-out area, comparing to the case where the second recording area 7 is available on the outside of the lead-out area when the recording and/or reproducing apparatus 40 records or reproduces the identification data. When a reproducing apparatus, which is unauthorized reproducing apparatus only corresponding to the conventional recording format, has an access to the second recording area 7, it is also possible to immediately reproduce the identification data. Therefore, it prevents the reading apparatus of this kind from falling under any error situations and operating wrongly.

Therefore, the optical disc 1 and 5 which can reproduce the data by the recording and/or reproducing apparatus 40 as described above, can be utilized in the following manner. For example, when a specific URL is recorded as the identification data on the optical disc 1 and 5, a user can have an access to the specific web site under the above specific URL via an electrical communication line such as an internet by using the recording and/or reproducing apparatus 40 or a personal computer, and can use the specific services only available for the user who bought the optical disc 1 through its official distribution channel.

The optical disc 1 and 5 in accordance with the present invention can prevent the identification data from being copied even though the concavo-convex pit pattern arranged on the basal plate is illegally copied since the identification data is electrothermally recorded on the pit pattern in the second recording area 3 and 7. Therefore, similar to the recording and/or reproducing apparatus 40, since it enables reproducing the digital content only when the control unit 51 detects the identification data, for example, it can prevent the optical disc illegally produced from being reproduced.

While the invention has been described in detail with respect to specific embodiments there of, taking an example of the optical disc 1 on which the information signal is recorded by a pit pattern, a recording pattern of the optical disc in accordance with the present invention is not limited to this example, and it may be a wobble group or a pit wobble.

Industrial Applicability

According to the present invention, there are arranged a first recording area having a first recording pattern and a second recording area having a second recording pattern in an optical disc, and by recording second data such as identification data to this second recording area, the optical disc as an information recording media can be managed surely.

The invention claimed is:

1. An optical disc reproducing method of detecting identification data from data read out from an optical disc formed of a basal plate made of synthetic resin that has a concavo-convex pattern formed in advance on one surface thereof based on data, and a reflective coat made of metal that is formed over the concavo-convex pattern on the basal plate, and identification data is recorded by irradiating an optical beam to the reflective coat to physically change the concavo-convex pattern, the method comprising the steps of:

attempting to detect the identification data; and suspending a playback operation for the optical disc when the identification data cannot be detected in said step of attempting to detect, wherein the identification data is recorded in an area of the disc that immediately follows a digital content recording area, as one considers the disc's recorded material along a radius proceeding from the disc's center outward, and the area in which the identification data is recorded is located at almost the central part of a lead-out area, wherein the identification data is recorded between recording tracks of the disc.

2. The optical disc reproducing method as claimed in claim 1, further comprising the step of judging whether or not the identification data can be detected first when reproducing information recorded on the optical disc.

3. Reproducing apparatus for reproducing data from an optical disc formed of a basal plate made of synthetic resin that has a concavo-convex pattern formed on one surface thereof based on data, and a reflective coat made of metal that is formed over the concavo-convex pattern on the basal plate and in which identification data is recorded by irradiating an optical beam to the reflective coat to physically change the concavo-convex pattern, the apparatus comprising:

means for detecting the identification data; and means for suspending a playback operation for the optical disc when the identification data can not be detected by said means for detecting, wherein the identification data is recorded in an area of the disc that immediately follows a digital content recording area, as one considers the disc's recorded material along a radius proceeding from the disc's center outward, and the area in which the identification data is recorded is located at almost the central part of a lead-out area, wherein the identification data is recorded between recording tracks of the disc.

4. The reproducing apparatus according to claim 3 further comprising:

means for judging whether the identification data can be detected first when reproducing information recorded on the optical disc.

5. The reproducing apparatus according to claim 3 further comprising:

operation means for use by a user in selecting said playback operation.

6. The reproducing apparatus according to claim 3 further comprising:

means for generating focusing error signals and tracking error signals based on the identification data detected by the means for detecting.

* * * * *